United States Patent [19]

Vieli

[11] 4,332,907
[45] Jun. 1, 1982

[54] GRANULATED FOAMED GLASS AND PROCESS FOR THE PRODUCTION THEREOF

[75] Inventor: Otto A. Vieli, Rhäzüns, Switzerland

[73] Assignee: Millcell AG, Sarnen, Switzerland

[21] Appl. No.: 195,197

[22] PCT Filed: Oct. 4, 1979

[86] PCT No.: PCT/CH79/00128

§ 371 Date: Jun. 6, 1980

§ 102(e) Date: Jun. 2, 1980

[87] PCT Pub. No.: WO80/00696

PCT Pub. Date: Apr. 17, 1980

[30] Foreign Application Priority Data

Oct. 6, 1978 [CH] Switzerland ................. 10440/78

[51] Int. Cl.$^3$ ............................................. C03C 11/00
[52] U.S. Cl. .............................. 501/39; 65/22; 65/21.4; 106/75; 106/97; 106/288 B; 501/155
[58] Field of Search .................... 501/39, 80, 33

[56] References Cited

U.S. PATENT DOCUMENTS

| | | | |
|---|---|---|---|
| 2,977,650 | 4/1961 | Ilenda et al. ................. | 106/80 X |
| 3,321,414 | 5/1967 | Vieli ............................ | 501/39 |
| 3,666,506 | 5/1972 | Cowan et al. ................ | 501/39 |
| 3,793,039 | 2/1974 | Rostoker ..................... | 501/39 |
| 4,081,259 | 3/1978 | Bassin et al. ................ | 501/33 X |
| 4,143,202 | 3/1979 | Tseng et al. ................. | 501/85 X |
| 4,234,330 | 11/1980 | Taupin et al. ................ | 106/80 |

FOREIGN PATENT DOCUMENTS 489083  5/1977  Australia ................. 106/84

OTHER PUBLICATIONS

Webster's Third New Int'l. Dictionary–(1976), p. 1780, "Pozzolana".

*Primary Examiner*—Helen M. McCarthy
*Attorney, Agent, or Firm*—Werner W. Kleeman

[57] ABSTRACT

An expanded glass aggregate has a granulometry of 0.2 to 3 mm and $10^6$ to $10^7$ cavities filled with gas per cm$^3$. The diameter of the larger cavities is substantially smaller than 0.1 mm. All or a majority of the cavities are closed cells having a similar size. The expanded glass aggregate may contain in addition up to 85% of concrete, lava and/or tuff. For the preparation, the raw material is ground into a flour, mixed with a blowing organic and/or inorganic material appropriate to hot release gas, and a semi-finished aggregate is formed with a diameter of the granules of 0.1 to 1.5 mm. This aggregate is heated in a vibrating or suspended furnace during 5 to 180 seconds at a temperature of 600° to 900° C. The expanded glass aggregate is removed away from the furnace before a significant number of small cavities formed during the blowing gather to form larger cavities.

4 Claims, No Drawings

GRANULATED FOAMED GLASS AND PROCESS FOR THE PRODUCTION THEREOF

CROSS REFERENCE TO RELATED CASE

This application is related to the commonly assigned, copending United States application Ser. No. 196,552, filed June 2, 1980, entitled "BLOWING AGENT FOR PRODUCING GLASS FOAM FROM PULVERIZED GLASS AND MANUFACTURING PROCESS THEREOF", and listing as the inventor OTTO ANTON VIELI.

The invention relates to a granulated foamed glass, produced by furnace blowing, as well as to a process for the production thereof.

Some processes are already known (cf. Swiss Patent Specifications Nos. 426,601 and 473,741; U.S. Pat. No. 3,321,414) for producing granulated foamed glass from glass powder by addition of a blowing agent which is releasing gas at higher temperatures. Such granulated material is mainly used as a component in lightweight concrete.

Further, a process for producing foamed products from silica gel is known (cf. French Published Application No. 2,242,561), wherein silica gel, without any additional agent, is pre-baked at 500° to 900° C., whereafter baking is completed at 1000° to 1450° C. Depending on the raw material used and the more costly production, the products obtained are considerably more expensive than granulated foamed glass, so that their use is restricted. They are used where, for chemical or thermic reasons, an essentially water-free silicon dioxide is needed.

It has been proved by tests that the compressive strength of such granulated foamed glass mentioned above increases almost linearly with the number of cavities per unit of volume produced in the granulated material by blowing. So, e.g., for $10^6$ cavities per cm$^3$, a compressive strength of 120 kg/cm$^2$ was found, whereas for $0.3 \times 10^6$ cavities per cm$^3$ a compressive strength of only 40 kg/cm$^2$ was found.

It is the object of the invention to produce granulated glass foam which has a considerably improved compressive strength, as compared with granulated glass foam known so far, and which can be used as a filler for plastics as well as for lightweight concrete.

The granulated glass foam, produced by furnace blowing, in accordance with the invention is characterized in that it has a granulometry of 0.2 to 3 mm, $10^6$ to $10^7$ cavities per cm$^3$, and a bulk density of 100 to 500 g/liter, and that the diameter of the largest cavities essentially is smaller than 0.1 mm.

Appropriately, the cavities are by the majority, and preferably essentially exclusively, closed cells of the same order of magnitude.

It may contain, besides glass, in addition up to 85% by weight of pumice, lava and/or tuff.

A further subject matter of the invention is a process for producing such granulated foam glass, which is characterized in that the raw materials are ground down to a powder, that this powder is mixed with an organic and/or inorganic blowing agent releasing gas in the heat, that granules having a diameter of 0.1 to 1.5 mm are formed from this mixture, and that these granules are heated in a fluidized bed furnace or a vibrating furnace for 5 to 180 seconds to 600° to 900° C., whereby the obtained granulated glass foam is removed from the furnace before the small cavities primarily formed by the blowing had time to combine into larger cavities to a considerable extent.

Appropriately, glass powder is produced by melting glass wastes, blowing the melt into glass fibers, and grinding the glass fibers so obtained.

As a blowing agent, preferably use is made of a colloidal dispersion comprising water, water glass, and an organic hydrocarbon compound soluble in water glass, preferably glycerol, and preferably also an alkali bentonite, particularly sodium bentonite (cf. Swiss Patent Application No. 10,441/78-1).

In carrying out the process according to the invention, preferably the raw granules together with a parting agent, e.g. aluminium oxide, metallurgical alumina, fireclay, bentonite or a mixture of bentonite and fireclay, are preheated in a furnace or on a drying belt to 450° to 650° C., and thereafter blown in a fluid bed furnace or a vibrating furnace. More particularly, blowing may be carried out in a rotary kiln held vibrating by vibrators.

By the so far known processes, upon blowing natural or artificial silicates, particularly glasses as well as clays, which preferably was done in rotary kilns with a low rate of temperature increase, granulated material was obained in which the small cavities primarily formed, and regularly distributed, in the further course of blowing combined into larger cavities, whereby cavites survived in the remaining walls. This kind of cavity formation may also be found in nature in volcanic earths originating from cooled magmas.

During blowing, the blowing mixture which is in liquid or pasty state, and is composed of cavities and homogeneous material, at least partially rearranges itself into a homogeneous polyhedric foam having thin cell walls, whereafter in the further course of blowing entire zones of polyhedric foam combine into large cavities delimited by thick walls containing microcavites.

In the process according to the invention, blowing is stopped once a homogenous cavity formation was reached in the initial phase, in which a polyhedric cell structure which at least essentially is homogenous was built as well, so that the formation of larger cavities, which would considerably lower strength, is avoided. By this, the ideal equilibrium structure in which three lamellas congregate along one edge, whereby two of them include an angle of 120°, at least for the most part survives.

In particular, this state can be obtained by blowing the raw granules by means of a relatively short heat blast, and thereafter slowly cooling down the blown granules.

It is indicated to effect blowing with increasing size of the raw granules, within the given time/temperature range, using longer durations and lower temperatures.

EXAMPLE

A. GLASS POWDER

Glass wastes are melted. The melt is blown into glass fibers which are ground into a fine glass powder.

B. ADJUVANT

The paste described below is prepared. It serves on the one hand as a binding agent for the glass powder in the subsequent granulating, and on the other hand as a flux and a blowing agent in the later blowing.

100 parts by weight water 32 parts by weight water glass
4 parts by weight glycerol
15 parts by weight sodium bentonite
are stirred together to form a fluid paste.

C. RAW GRANULES

The paste obtained according to B. is added to and thoroughly mixed with 500 parts by weight of the glass powder obtained according to A.

The so obtained composition is formed in a granulator into raw granules having a diameter of about 1 mm. Thereafter, the humid granulated material is dried on a drying belt at about 600° C. Any blowing does not yet take place, and the blowing power of the blowing agent if not affected.

By the pre-heating associated with the drying at the said high temperature, the throughput of the blowing furnace during subsequent blowing is increased.

D. BLOWING

Blowing of the pre-heated raw granules obtained according to C. is effected in a vibrating rotary kiln at about 700° C., using finely powdered aluminium oxide as a parting agent, whereby the furnace walls and the parting agent have a temperature which is about 50° C. higher.

In order to increase the efficency of the furnace, the hot parting agent is recycled to the feeding side of the furnace.

The emerging blown granulated foam glass, having a granulometry of about 2 mm, is slowly cooled down on a cooling belt.

What is claimed is:

1. Granulated foamed glass, produced by furnace blowing, characterized in that it has a granulometry of 0.2 to 3 mm, $10^6$ to $10^7$ cavities per $cm^3$, a compressive strength of at least about 120 $kg/cm^2$, a bulk density of 100 to 500 g/liter, and that the diameter of the largest cavities essentially is smaller than 0.1 mm.

2. Granulated foamed glass as claimed in claim 1, characterized in that it contains as cavities by the majority closed cells of the same order of magnitude.

3. Granulated foamed glass as claimed in claim 2, characterized in that it contains as cavities essentially exclusively closed cells of the same order of magnitude.

4. Granulated glass foamed glass as claimed in any one of claims 1 to 3, made from material which contains, besides glass, in addition up to 85% by weight of pumice, lava and/or tuff.

* * * * *